US011372673B2

(12) United States Patent
Xu et al.

(10) Patent No.: US 11,372,673 B2
(45) Date of Patent: Jun. 28, 2022

(54) ARTIFICIAL INTELLIGENCE CHIP AND INSTRUCTION EXECUTION METHOD FOR ARTIFICIAL INTELLIGENCE CHIP

(71) Applicant: BEIJING BAIDU NETCOM SCIENCE AND TECHNOLOGY CO., LTD., Beijing (CN)

(72) Inventors: Ningyi Xu, Beijing (CN); Yan Huang, Beijing (CN); Jinchen Han, Beijing (CN); Peng Wu, Beijing (CN); Jiaxin Shi, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 302 days.

(21) Appl. No.: 16/505,127

(22) Filed: Jul. 8, 2019

(65) Prior Publication Data

US 2020/0050476 A1    Feb. 13, 2020

(30) Foreign Application Priority Data

Aug. 10, 2018    (CN) .......................... 201810910206.6

(51) Int. Cl.
*G06F 9/46* (2006.01)
*G06F 9/38* (2018.01)
(Continued)

(52) U.S. Cl.
CPC ............ *G06F 9/463* (2013.01); *G06F 9/3891* (2013.01); *G06F 9/5027* (2013.01); *G06F 9/52* (2013.01)

(58) Field of Classification Search
None
See application file for complete search history.

(56) References Cited

U.S. PATENT DOCUMENTS 7,516,456 B2 *  4/2009  Aguilar, Jr. ........... G06F 9/4881
                                                               718/102
9,772,853 B1     9/2017  Fields et al.
(Continued)

FOREIGN PATENT DOCUMENTS

CN    102073618 A    5/2011
CN    102708009 A    10/2012
(Continued)

OTHER PUBLICATIONS

Japanese Office Action for related Application No. 2019-125661; dated Jun. 3, 2021.
(Continued)

*Primary Examiner* — Bing Zhao
(74) *Attorney, Agent, or Firm* — von Briesen & Roper, s.c.

(57) ABSTRACT

Embodiments of the present disclosure disclose an artificial intelligence chip and an instruction execution method for an artificial intelligence chip. A specific embodiment of the artificial intelligence chip includes: an instruction memory, a data memory, at least one general execution unit, and at least one dedicated execution unit. The instruction memory is configured to: receive a kernel code including at least one code block. The general execution unit is configured to: receive the code block, lock the dedicated execution unit associated with the received code block, and send an instruction in the received code block to the locked dedicated execution unit. The dedicated execution unit is configured to: execute the received instruction, and store an execution result in the data memory. The data memory is configured to: store the execution result sent by the dedicated execution unit.

16 Claims, 7 Drawing Sheets

(51) Int. Cl.
   *G06F 9/52*    (2006.01)
   *G06F 9/50*    (2006.01)

(56)        References Cited

U.S. PATENT DOCUMENTS

2011/0107069 A1    5/2011  Hansen et al.
2019/0347542 A1*  11/2019  Chen ........................ G06T 1/20

FOREIGN PATENT DOCUMENTS

| CN | 103905310 A | 7/2014 |
| CN | 106325967 A | 1/2017 |
| CN | 107766079 A | 3/2018 |
| JP | H1091591 A | 4/1998 |
| JP | 19102 CN | 9/2000 |
| JP | 2001167058 A | 6/2001 |
| JP | 2006260377 A | 9/2006 |
| JP | 2016021262 A | 2/2016 |
| JP | 2017507398 A | 3/2017 |
| KR | 20080070599 A | 7/2008 |
| KR | 20100122875 A | 11/2010 |
| KR | 20130107361 A | 10/2013 |
| WO | WO 2011148920 A1 | 12/2011 |

OTHER PUBLICATIONS

South Korean Office Action related to Application No. 10-2019-0082871; dated Sep. 30, 2021.
Chinese Office Action for related Application No. 201810910206.6; dated Nov. 30, 2021.

* cited by examiner

ARTIFICIAL INTELLIGENCE CHIP AND INSTRUCTION EXECUTION METHOD FOR ARTIFICIAL INTELLIGENCE CHIP

CROSS-REFERENCE TO RELATED APPLICATIONS

This application claims priority to Chinese Application No. 201810910206.6, filed on Aug. 10, 2018 and entitled "Artificial Intelligence Chip and Instruction Execution Method for Artificial Intelligence Chip," the entire disclosure of which is hereby incorporated by reference.

TECHNICAL FIELD

Embodiments of the present disclosure relate to the field of computer technology, specifically to an artificial intelligence chip and an instruction execution method for an artificial intelligence chip.

BACKGROUND

With the rapid development of artificial intelligence technology, the size of the neural network model is growing, and the amount of training data is increasing. Therefore, the use of a dedicated neural network accelerator for neural network training and predictive computing has become the mainstream trend. In this regard, various neural network accelerators have been developed, such as a GPU (Graphics Processing Unit), an FPGA (Field-Programmable Gate Array), and an ASIC (Application Specific Integrated Circuit).

These neural network accelerators may be specifically optimized for typical, highly computationally intensive computing tasks in neural networks, such as matrix calculations (or multiply-accumulates involved in matrix calculations), activation operations, and vector operations. Generally speaking, a neural network accelerator may have several different execution units built in, each of the execution units may perform a different computing task, and is scheduled to be executed by a CPU (Central Processing Unit) of the host.

In the existing technology, a GPU may be responsible for computationally intensive computing tasks in the neural network model, and the CPU is responsible for controlling the operation of the GPU. For example, the CPU is responsible for parsing a deep learning model described by a user-defined static calculation chart, acquiring an operation task sequence, sending an operation task to the GPU, and then waiting for the GPU to perform the operation task, and then sending the next operation task to the GPU, . . . , and so on.

SUMMARY

Embodiments of the present disclosure provide an artificial intelligence chip and an instruction execution method for an artificial intelligence chip.

In a first aspect, the embodiments of the present disclosure provide an artificial intelligence chip, including: an instruction memory, a data memory, at least one general execution unit, and at least one dedicated execution unit; the instruction memory is configured to: receive a kernel code sent by a central processing unit, the kernel code including at least one code block, a code block in the at least one code block being associated with a general execution unit and a dedicated execution unit; the general execution unit is configured to: receive the code block, lock the dedicated execution unit associated with the received code block, and send an instruction in the received code block to the locked dedicated execution unit; the dedicated execution unit is configured to: receive the instruction sent by the general execution unit, execute the received instruction, and store an execution result in the data memory; and the data memory is configured to: store the execution result sent by the dedicated execution unit.

In some embodiments, the code block in the at least one code block includes a first instruction and a second instruction set; and the general execution unit is specifically configured to: execute, in response to receiving the code block, the first instruction to lock the dedicated execution unit associated with the received code block; and send second instructions in the second instruction set sequentially to the locked dedicated execution unit.

In some embodiments, the code block in the at least one code block includes a first instruction and a second instruction set; and the general execution unit is specifically configured to: execute, in response to receiving the code block, the first instruction to lock at least one dedicated execution unit associated with the received code block; and determine, for a second instruction in the second instruction set, a dedicated execution unit from the at least one locked dedicated execution unit to execute the second instruction, and send the second instruction to the determined dedicated execution unit.

In some embodiments, the artificial intelligence chip further includes a local control memory storing a value of at least one local variable, and the local control memory is configured to: receive a local variable update request sent by the general execution unit, the local variable update request including a target value of a predetermined local variable; and update a value of the predetermined local variable to the target value.

In some embodiments, the local control memory is further configured to send to the at least one general execution unit a notification that the predetermined local variable is updated; and the general execution unit waiting for the notification that the predetermined local variable is updated is further configured to continue executing the instruction in the received code block, in response to receiving the notification.

In some embodiments, the general execution unit is further configured to: detect whether a value of a target local variable is updated in a polling approach; and continue executing the instruction in the received code block, in response to detecting that the value of the target local variable is updated.

In some embodiments, the artificial intelligence chip further includes at least one computing cluster, a computing cluster in the at least one computing cluster includes a data memory, at least one general execution unit, and at least one dedicated execution unit.

In some embodiments, the artificial intelligence chip further includes a global control memory, the computing cluster further includes a local control memory, the global control memory stores a value of at least one global variable, the local control memory stores a value of at least one local variable; and the global control memory is configured to: receive a global variable update request sent by the computing cluster, the global variable update request including a target value of a predetermined global variable; and update a value of the predetermined global variable to the target value.

In some embodiments, the global control memory is further configured to send to at least one local control memory, a notification that the predetermined global variable is updated; and the local control memory waiting for the notification that the predetermined global variable is updated is further configured to update a value of a local variable associated with the predetermined global variable, in response to receiving the notification.

In some embodiments, the local control memory is further configured to: detect whether a value of a target global variable is updated in a polling approach; and update the value of the local variable associated with the predetermined global variable, in response to detecting that the value of the target local variable is updated.

In some embodiments, the dedicated execution unit locked by the general execution unit is not unlocked during execution of the kernel code.

In some embodiments, the general execution unit is further configured to: cyclically execute the second instruction set after executing the first instruction.

In some embodiments, the kernel code is acquired by parsing an input data flow diagram by the central processing unit, and the data flow diagram is acquired by mapping a static map of a neural network model.

In a second aspect, the embodiments of the present disclosure provide an instruction execution method for an artificial intelligence chip, the artificial intelligence chip including an instruction memory, a data memory, at least one general execution unit, and at least one dedicated execution unit, the instruction memory being communicatively connected with a central processing unit, and the method includes: receiving a code block from the instruction memory, the code block being acquired by the instruction memory from a kernel code sent by the central processing unit, the code block being associated with a dedicated execution unit; locking the dedicated execution unit associated with the code block; and sending an instruction in the code block to the locked dedicated execution unit, the dedicated execution unit being configured to execute the received instruction and store an execution result in the data memory.

In some embodiments, the code block includes a first instruction and a second instruction set; the locking the dedicated execution unit associated with the code block, includes: execute the first instruction to lock the dedicated execution unit associated with the code block; and the sending an instruction in the code block to the locked dedicated execution unit, includes: send second instructions in the second instruction set sequentially to the locked dedicated execution unit.

In some embodiments, the code block includes a first instruction and a second instruction set; the locking the dedicated execution unit associated with the code block, includes: execute the first instruction to lock at least one dedicated execution unit associated with the code block; and the sending an instruction in the code block to the locked dedicated execution unit, includes: determine, for a second instruction in the second instruction set, a dedicated execution unit from the at least one locked dedicated execution unit to execute the second instruction, and send the second instruction to the determined dedicated execution unit.

In some embodiments, the artificial intelligence chip further includes a local control memory storing a value of at least one local variable, and the local control memory is configured to: receive a local variable update request sent by the general execution unit, the local variable update request including a target value of a predetermined local variable; and update a value of the predetermined local variable to the target value.

In some embodiments, the artificial intelligence chip further includes a local control memory storing a value of at least one local variable; and the method further includes: continuing executing the instruction in the code block, in response to receiving a notification that a target local variable is updated.

In some embodiments, the artificial intelligence chip further includes a local control memory storing a value of at least one local variable; and the method further includes: detecting whether a value of a target local variable is updated in a polling approach; and continuing executing the instruction in the code block, in response to detecting that the value of the target local variable is updated.

In some embodiments, the artificial intelligence chip further includes at least one computing cluster, a computing cluster in the at least one computing cluster includes a data memory, at least one general execution unit, and at least one dedicated execution unit.

In some embodiments, the artificial intelligence chip further includes a global control memory, the computing cluster further includes a local control memory, the global control memory stores a value of at least one global variable, the local control memory stores a value of at least one local variable; and the global control memory is configured to: receive a global variable update request sent by the computing cluster, the global variable update request including a target value of a predetermined global variable; and update a value of the predetermined global variable to the target value.

In some embodiments, the global control memory is further configured to send to at least one local control memory, a notification that the predetermined global variable is updated; and the local control memory waiting for the notification that the predetermined global variable is updated is further configured to update a value of a local variable associated with the predetermined global variable, in response to receiving the notification.

In some embodiments, the local control memory is further configured to: detect whether a value of a target global variable is updated in a polling approach; and update the value of the local variable associated with the predetermined global variable, in response to detecting that the value of the target local variable is updated.

In some embodiments, the dedicated execution unit locked by the general execution unit is not unlocked during execution of the kernel code.

In some embodiments, the method further includes: cyclically executing the second instruction set after executing the first instruction.

In some embodiments, the kernel code is acquired by parsing an input data flow diagram by the central processing unit, and the data flow diagram is acquired by mapping a static map of a neural network model.

In a third aspect, the embodiments of the present disclosure provide an instruction execution apparatus for an artificial intelligence chip, the artificial intelligence chip including an instruction memory, a data memory, at least one general execution unit, and at least one dedicated execution unit, the instruction memory being communicatively connected with a central processing unit, and the apparatus includes: a code receiving unit, configured to receive a code block from the instruction memory, the code block being acquired by the instruction memory from a kernel code sent by the central processing unit, the code block being associated with a dedicated execution unit; a locking unit, configured to lock the dedicated execution unit associated with the code block; and an instruction sending unit, configured to send an instruction in the code block to the locked dedicated execution unit, the dedicated execution unit being configured to execute the received instruction and store an execution result in the data memory.

In some embodiments, the code block includes a first instruction and a second instruction set; the locking unit is specifically configured to: execute the first instruction to lock the dedicated execution unit associated with the code block; and the instruction sending unit is specifically configured to: send second instructions in the second instruction set sequentially to the locked dedicated execution unit.

In some embodiments, the code block includes a first instruction and a second instruction set; the locking unit is specifically configured to: execute the first instruction to lock at least one dedicated execution unit associated with the code block; and the instruction sending unit is specifically configured to: determine, for a second instruction in the second instruction set, a dedicated execution unit from the at least one locked dedicated execution unit to execute the second instruction, and send the second instruction to the determined dedicated execution unit.

In some embodiments, the artificial intelligence chip further includes a local control memory storing a value of at least one local variable, and the local control memory is configured to: receive a local variable update request sent by the general execution unit, the local variable update request including a target value of a predetermined local variable; and update a value of the predetermined local variable to the target value.

In some embodiments, the artificial intelligence chip further includes a local control memory storing a value of at least one local variable; and the apparatus further includes a continuing execution unit, the continuing execution unit is configured to: continue executing the instruction in the code block, in response to receiving a notification that a target local variable is updated.

In some embodiments, the artificial intelligence chip further includes a local control memory storing a value of at least one local variable; and the apparatus further includes: a detection unit, configured to detect whether a value of a target local variable is updated in a polling approach; and a continuing execution unit, configured to continue executing the instruction in the code block, in response to detecting that the value of the target local variable is updated.

In some embodiments, the artificial intelligence chip further includes at least one computing cluster, a computing cluster in the at least one computing cluster includes a data memory, at least one general execution unit, and at least one dedicated execution unit.

In some embodiments, the artificial intelligence chip further includes a global control memory, the computing cluster further includes a local control memory, the global control memory stores a value of at least one global variable, the local control memory stores a value of at least one local variable; and the global control memory is configured to: receive a global variable update request sent by the computing cluster, the global variable update request including a target value of a predetermined global variable; and update a value of the predetermined global variable to the target value.

In some embodiments, the global control memory is further configured to send to at least one local control memory, a notification that the predetermined global variable is updated; and the local control memory waiting for the notification that the predetermined global variable is updated is further configured to update a value of a local variable associated with the predetermined global variable, in response to receiving the notification.

In some embodiments, the local control memory is further configured to: detect whether a value of a target global variable is updated in a polling approach; and update the value of the local variable associated with the predetermined global variable, in response to detecting that the value of the target local variable is updated.

In some embodiments, the dedicated execution unit locked by the general execution unit is not unlocked during execution of the kernel code.

In some embodiments, the apparatus further includes: a circulating unit, configured to cyclically execute the second instruction set after executing the first instruction.

In some embodiments, the kernel code is acquired by parsing an input data flow diagram by the central processing unit, and the data flow diagram is acquired by mapping a static map of a neural network model.

In a fourth aspect, the embodiments of the present disclosure provide a computer readable medium, storing a computer program thereon, the program, when executed by an execution unit, implements the method according to any one of the embodiments in the second aspect.

In a fifth aspect, the embodiments of the present disclosure provide an electronic device, including: a central processing unit, a storage apparatus, and at least one artificial intelligence chip described according to any one of the embodiments in the first aspect.

In the artificial intelligence chip and the instruction execution method for an artificial intelligence chip provided by the embodiments of the present disclosure, the instruction memory receives a kernel code including at least one code block from the CPU, then the dedicated execution unit locks the dedicated execution unit associated with the received code block and sends an instruction in the code block to the locked dedicated execution unit, and finally the dedicated execution unit executes the received instruction and sends an execution result to the data memory for storage, therefore, frequent communication with the CPU during execution of the kernel code is avoided, and frequent locking/unlocking of the dedicated execution unit is avoided, thus improving the performance of the artificial intelligence chip.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
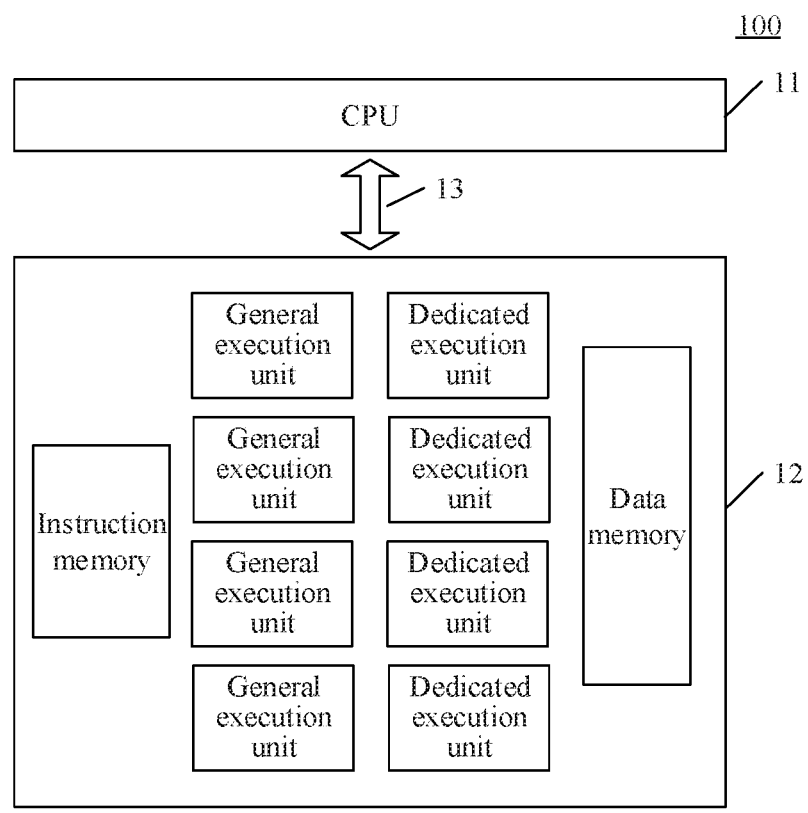
FIG. 1 is a diagram of an exemplary system architecture in which an embodiment of the present disclosure may be implemented.

FIG. 1 illustrates an exemplary system architecture 100 in which an embodiment of an artificial intelligence chip, an instruction execution method for an artificial intelligence chip and an instruction execution apparatus for an artificial intelligence chip of the present disclosure may be implemented.

As shown in FIG. 1, the system architecture 100 may include a CPU 11, an artificial intelligence (AI) chip 12, and a bus 13. The bus 13 serves as a medium providing a communication link between the CPU 11 and the artificial intelligence chip 12, for example, a PCIE (Peripheral Component Interconnect Express) bus or the like.

The CPU 11 may interact with the artificial intelligence chip 12 via the bus 13 to transmit or receive messages. The CPU 11 may transmit a kernel code to the artificial intelligence chip 12, and receive a processing result returned by the artificial intelligence chip 12.

The artificial intelligence chip 12, also known as an AI accelerator or a computing card, is dedicated to processing a large number of computationally intensive computing tasks in artificial intelligence applications. The artificial intelligence chip 12 may include an instruction memory, a data memory, at least one general execution unit, and at least one dedicated execution unit. The instruction memory may receive the kernel code sent by the CPU 11. The general execution unit may receive a code block distributed by the instruction memory or actively acquire the associated code block from the instruction memory, and then send an instruction to a dedicated execution unit that is explicitly specified in advance. The dedicated execution unit may execute the received instruction and send an execution result to the data memory for storage. The data memory may store an instruction execution result of the dedicated execution unit.

It should be noted that the instruction execution method for an artificial intelligence chip provided by the embodiments of the present disclosure is generally executed by the general execution unit. Accordingly, the instruction execution apparatus for an artificial intelligence chip is generally provided in the general execution unit.

It should be understood that the numbers of the CPUs, the buses, the artificial intelligence chips, the instruction memories, the data memories, the general execution units, and the dedicated execution units in FIG. 1 are merely illustrative. Any number of CPUs, buses, artificial intelligence chips, instruction memories, data memories, general execution units, and dedicated execution units may be provided based on the implementation requirements.

Figure 2:
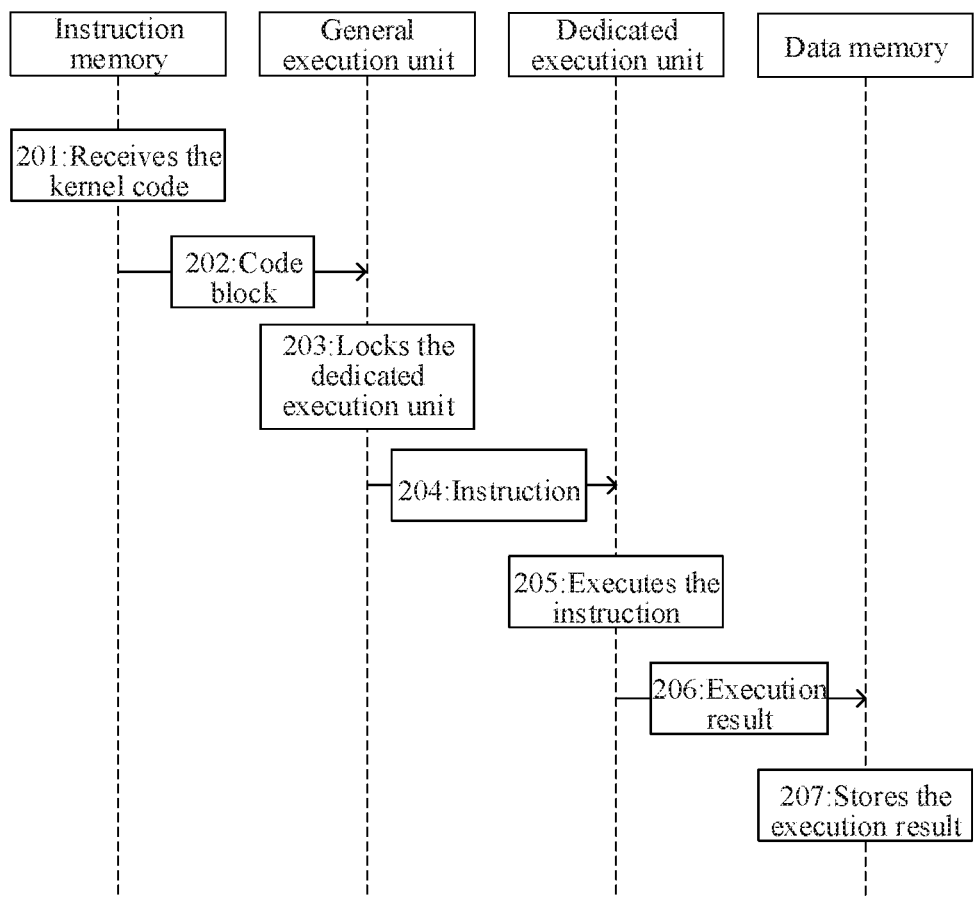
FIG. 2 is an operational timing diagram of an embodiment of an artificial intelligence chip according to the present disclosure.

With further reference to FIG. 2, an operational timing 200 of an embodiment of an artificial intelligence chip according to the present disclosure is illustrated.

The artificial intelligence chip of the present embodiment may include an instruction memory, a data memory, at least one general execution unit, and at least one dedicated execution unit. The instruction memory may be configured to: receive a kernel code sent by a central processing unit, the kernel code including at least one code block, a code block in the at least one code block being associated with a general execution unit and a dedicated execution unit. The general execution unit may be configured to: receive the code block, lock the dedicated execution unit associated with the received code block, and send an instruction in the received code block to the locked dedicated execution unit. The dedicated execution unit may be configured to: receive the instruction sent by the general execution unit, execute the received instruction, and store an execution result in the data memory. The data memory may be configured to: store the execution result sent by the dedicated execution unit.

As shown in FIG. 2, in step 201, the instruction memory receives the kernel code sent by the CPU.

In the present embodiment, the instruction memory (e.g., the instruction memory shown in FIG. 1) may receive the kernel code sent by a CPU of a host (e.g., the CPU shown in FIG. 1). The kernel code includes at least one code block. Each of the at least one code block is associated with a general execution unit and at least one dedicated execution unit.

In some alternative implementations of the present embodiment, the general execution unit may include a programmable general computing graphics processor, such as an ARM (Advanced RISC Machine or Acorn RISC Machine, Advanced reduced instruction set computer) core, or a 51 core. The dedicated execution unit may include an execution unit dedicated to processing a computationally intensive computing task in a neural network model, which may include, but is not limited to, at least one of the following: a convolution engine, a single data processor, a plane data processor, a channel data processor, a dedicated memory and data refactoring engine. The convolution engine is used for processing data of the convolutional layer of the neural network model, the single data processor is used for processing data of the activation function layer of the neural network model, the plane data processor is used for processing data of the pooling layer of the neural network model, and the channel data processor is used for processing data of the standardized layer of the neural network model, while the dedicated memory and data refactoring engine is used for scalar reshaping and copying operations to memory-to-memory conversion acceleration.

In some alternative implementations of the present embodiment, the kernel code may be acquired by parsing an input data flow diagram by the CPU. For example, the data flow diagram is converted to kernel code of a particular programming language (e.g., C, C++, Java, etc.) according to an agreed programming protocol. Here, the data flow diagram may be acquired by mapping a static map of a neural network model inputted by the user.

Here, the neural network model may be an Artificial Neural Network (ANN). The artificial neural network is a simple model that is established through abstracting neural network of human brain using a mathematical and physical method based on basic understanding of the neural network of human brain from the perspective of information processing. For example, the neural network model may include a Convolutional Neural Network (CNN) model, a Deep Neural Network (DNN) model, or the like.

In step 202, the general execution unit receives the code block.

In the present embodiment, the general execution unit (e.g., the general execution unit shown in FIG. 1) may receive the code block from the instruction memory.

Here, the general execution unit may directly receive the associated code block. For example, the general execution unit does not need to send an acquisition request to the instruction memory, and directly receives the code block issued by the instruction memory according to the association relationship between the code block and the general execution unit.

In addition, the general execution unit may also directly receive the kernel code and then extract the associated code block from the kernel code. In addition, the general execution unit may also acquire the associated code block by sending a request to the instruction memory.

In some alternative implementations of the present embodiment, each of the at least one code block may include a first instruction and a second instruction set. The first instruction is used to lock a dedicated execution unit associated with the code block when executed by the general execution unit. Each second instruction in the second instruction set is used to process computationally intensive computing tasks when executed by the dedicated execution unit. The second instructions in the second instruction set are sent by the general execution unit to the dedicated execution unit after execution of the first instruction (i.e., after locking the dedicated execution unit).

For example, for a code block including the following code "lock(dma);loadDataToL2( );", "lock(dma)" is the first instruction of the code block, and "loadDataToL2( )" is the second instruction of the code block. The first instruction is used to lock a dedicated execution unit named "dma", and the second instruction is used to load data into the level 2 cache.

In some alternative implementations of the present embodiment, the code block may also include a loop fragment. The loop fragment may include the second instruction set. That is, each second instruction in the second instruction set is executed cyclically after the first instruction is executed.

For example, for a code block including the following code "lock(mac);while(1){convolution( )}", "lock(mac)" is the first instruction of the code block, "while(1){convolution( );}" is the loop fragment of the code block, and "convolution( )" is the second instruction in the loop fragment. The first instruction is used to lock the dedicated execution unit named "mac", the second instruction is used to perform a convolution operation, and the loop fragment is used to cyclically execute the second instruction (i.e., cyclically execute the convolution operation).

In step 203, the general execution unit locks the dedicated execution unit.

In the present embodiment, in response to receiving the associated code block, the general execution unit may lock the dedicated execution unit associated with the received code block. As an example, if the general execution unit receives a code block including the following code "lock (dma);loadDataToL2( )", it may lock the dedicated execution unit named "dma".

Since the dedicated execution unit may be invoked by any one of the general execution units, in order to avoid conflicts when the general execution unit invokes a dedicated execution unit, the dedicated execution unit needs to be locked. The general execution unit may lock the dedicated execution unit by using various suitable methods. For example, a mechanism that employs a lock (i.e., each dedicated execution unit may have a lock that may be invoked. Here, the lock may be implemented by a software programming method). The locking method of invoking the lock of the dedicated execution unit may implement locking of the dedicated execution unit (i.e., the locked dedicated execution unit cannot be invoked by other general execution units).

It should be noted that the general execution unit may lock one dedicated execution unit or lock more than one dedicated execution unit. Those skilled in the art may set according to the needs of the actual application scenario, which is not specifically limited in the present disclosure.

In step 204, the general execution unit sends an instruction in the code block to the dedicated execution unit.

In the present embodiment, after locking the dedicated execution unit associated with the received code block, the general execution unit may send an instruction in the received code block for processing a computationally intensive task to the locked dedicated execution unit.

In some alternative implementations of the present embodiment, when a dedicated execution unit is locked, the general execution unit may send each of the second instructions in the second instruction set sequentially to the locked dedicated execution unit in the order of execution.

In some alternative implementations of the present embodiment, when more than one dedicated execution unit is locked, for each of the second instructions in the second instruction set, the general execution unit may first determine a dedicated execution unit from the at least one locked dedicated execution units to execute the second instruction, and then send the second instruction to the determined dedicated execution unit.

In step 205, the dedicated execution unit executes the received instruction.

In the present embodiment, in response to receiving the instruction sent by the general execution unit, the dedicated execution unit may execute the received instruction.

In step 206, the dedicated execution unit sends an execution result to the data memory.

In the present embodiment, the dedicated execution unit sends an execution result to the data memory after the execution of the instruction. Here, the data memory may include a level 1 cache, a level 2 cache, a level 3 cache, or the like.

In step 207, the data memory stores the execution result.

In the present embodiment, the data memory may receive the execution result of the dedicated execution unit and store the received execution result.

As can be seen from the operational timing of FIG. 2, unlike frequent locking/unlocking dedicated execution units, the artificial intelligence chip of the present disclosure keeps the state of the dedicated execution unit locked by the general execution unit during the entire execution of the kernel code, thereby avoiding the process of frequent locking/unlocking, and improving the performance of the artificial intelligence chip.

If the artificial intelligence chip needs to communicate with the application running on the CPU of the host to receive the next task every time a computing task is completed, then the performance of the artificial intelligence chip may be obviously affected in the case of very high performance of the artificial intelligence chip and very short execution time for the computing task. For example, if the artificial intelligence chip takes 5 us per operation, and takes 10 us for the artificial intelligence chip to communicate with the CPU, then about two-thirds of the time of the artificial intelligence chip is idle, which is equivalent to wasting most of the performance of the artificial intelligence chip.

In the present embodiment, the artificial intelligence chip only needs to communicate with the CPU once to acquire the kernel code of the neural network model, and during the entire execution of the kernel code, the artificial intelligence chip does not need to communicate with the CPU, that is, there is basically no waiting time for the artificial intelligence chip, thereby significantly improving the performance of the artificial intelligence chip.

Figure 3:
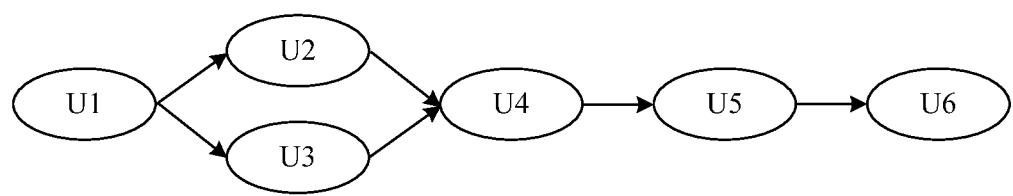
FIG. 3 is a schematic diagram of an application scenario of the artificial intelligence chip according to the present disclosure.

With further reference to FIG. 3, an application scenario of the artificial intelligence chip according to the present disclosure is illustrated. FIG. 3 illustrates a data flow diagram obtained by mapping a neural network model (e.g., a facial recognition model). In the data flow diagram, U1~U6 refer to different dedicated execution units, respectively, and arrows indicate the direction of the data flow. The kernel code that implements the data flow diagram is as follows:

```
Case(get_core_id( )):
    0:              lock(U1);
        loadDataToL2( );
    1:      lock(U2);
        while(1){
                    convolution( );
        }
    2:              lock(U3);
        ......;
    3:              lock(U4);
        ......;
    4:              lock(U5);
        ......;
    5:              lock(U6);
        ......;
```

The kernel code includes 6 code blocks (i.e., code snippets after the numbers 0~5). The CPU sends the kernel code to the instruction memory of the artificial intelligence chip. The instruction memory may first acquire the identifier of each general execution unit (acquired by the instruction "get_core_id( )", where the values of the identifiers are respectively numbers 0 to 5), then send the code block "lock(U1);loadDataToL2( )" to the general execution unit with the identifier 0, send the code block "lock(U2); while (1){convolution( )}" to the general execution unit with the identifier 1, . . . , and send the code block "lock(U6); . . . ;" to the general execution unit with the identifier 5. After receiving the code block, the general execution unit with the identifier 0 locks a dedicated execution unit U1 and then transmits the instruction "loadDataToL2( )" to the dedicated execution unit U1. After receiving the code block, the general execution unit with the identifier 1 locks a dedicated execution unit U2 and then continually transmits the instruction "convolution( )" to the dedicated execution unit U2, and so on. The dedicated execution units U1~U6 send instruction execution results to the data memory for storage.

In the artificial intelligence chip provided by the above embodiment of the present disclosure, the instruction memory receives a kernel code including at least one code block from the CPU, then the general execution unit locks the dedicated execution unit associated with the received code block and sends an instruction in the code block to the locked dedicated execution unit, and finally the dedicated execution unit executes the received instruction and sends an execution result to the data memory for storage, and therefore, frequent communication with the CPU during execution of the kernel code is avoided, and frequent locking/unlocking of the dedicated execution unit is avoided, thus improving the performance of the artificial intelligence chip.

Figure 4:
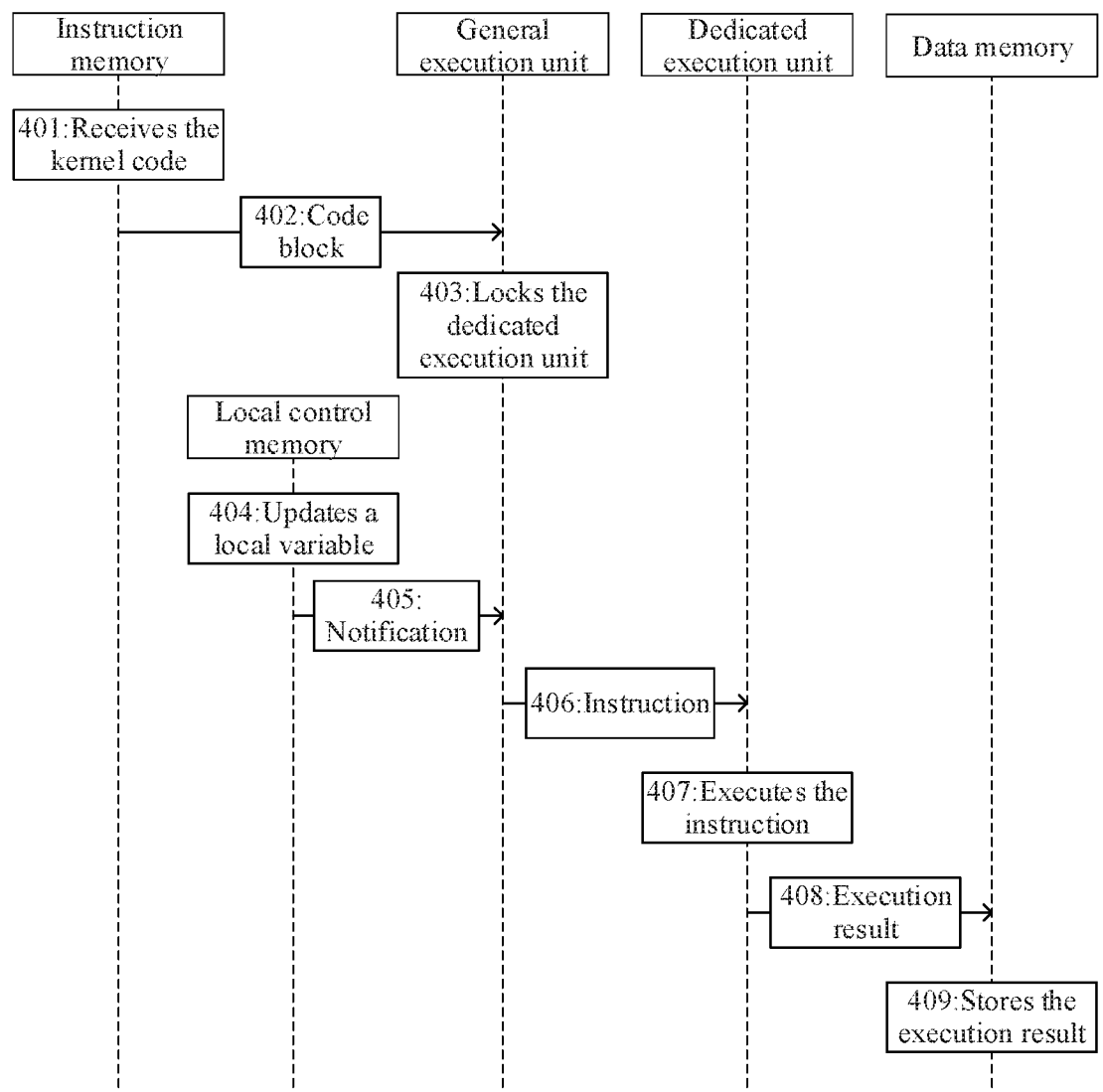
FIG. 4 is an operational timing diagram of another embodiment of the artificial intelligence chip according to the present disclosure.

With further reference to FIG. 4, an operational timing 400 of another embodiment of the artificial intelligence chip according to the present disclosure is illustrated.

The artificial intelligence chip of the present embodiment may include an instruction memory, a data memory, a local control memory, at least one general execution unit, and at least one dedicated execution unit. The instruction memory may be configured to: receive a kernel code sent by a central processing unit, the kernel code including at least one code block, a code block in the at least one code block being associated with a general execution unit and a dedicated execution unit. The general execution unit may be configured to: receive the code block, lock the dedicated execution unit associated with the received code block, and send an instruction in the received code block to the locked dedicated execution unit. The dedicated execution unit may be configured to: receive the instruction sent by the general execution unit, execute the received instruction, and store an execution result in the data memory. The data memory may be configured to: store the execution result sent by the dedicated execution unit. The local control memory may store a value of at least one local variable. The local control memory may be configured to: receive a local variable update request sent by the general execution unit, the local variable update request including a target value of a predetermined local variable; and update a value of the predetermined local variable to the target value.

As shown in FIG. 4, in step 401, the instruction memory receives the kernel code sent by the CPU.

In the present embodiment, the instruction memory (e.g., the instruction memory shown in FIG. 1) may receive the kernel code sent by a CPU of a host (e.g., the CPU shown in FIG. 1). The kernel code includes at least one code block. Each of the at least one code block is associated with a general execution unit and at least one dedicated execution unit.

In step 402, the general execution unit receives the code block.

In the present embodiment, the general execution unit (e.g., the general execution unit shown in FIG. 1) may receive the code block from the instruction memory.

In step 403, the general execution unit locks the dedicated execution unit.

In the present embodiment, in response to receiving the associated code block, the general execution unit may lock the dedicated execution unit associated with the received code block. As an example, if the general execution unit receives a code block including the following code "lock (dma);loadDataToL2( );", it may lock the dedicated execution unit named "dma".

Then, the general execution unit enters a waiting state, waiting for a notification that a predetermined local variable in the local control memory is updated.

In step 404, the local control memory updates a value of the predetermined local variable.

In the present embodiment, the local control memory may receive a local variable update request sent by other general execution units, and then update the value of the predetermined local variable to a target value. The local variable update request includes the target value of the predetermined local variable. Here, the value of the local variable may be a binary value such as 0 or 1. The value of the local variable may also be other preset values, which is not specifically limited in the present disclosure.

In step 405, the local control memory sends a notification to the general execution unit.

In the present embodiment, the local control memory may send to each general execution unit, a notification that the predetermined local variable is updated.

In step 406, the general execution unit sends an instruction in the code block to the dedicated execution unit.

In the present embodiment, in response to receiving the notification that the predetermined local variable is updated, the general execution unit may send an instruction in the received code block for processing a computationally intensive task to the locked dedicated execution unit.

In step 407, the dedicated execution unit executes the received instruction.

In the present embodiment, in response to receiving the instruction sent by the general execution unit, the dedicated execution unit may execute the received instruction.

In step 408, the dedicated execution unit sends an execution result to the data memory.

In the present embodiment, the dedicated execution unit sends an execution result to the data memory after the execution of the instruction. Here, the data memory may include a level 1 cache, a level 2 cache, a level 3 cache, or the like.

In step 409, the data memory stores the execution result.

In the present embodiment, the data memory may receive the execution result of the dedicated execution unit and store the received execution result.

As can be seen from the operational timing of FIG. 4, synchronization between any two general execution units is implemented by providing a local control memory, thereby ensuring that each code block of the kernel code is executed in a desired order and controlling of the artificial intelligence chip is more flexible.

Although the general execution unit locks the dedicated execution unit and enters a waiting state and the local control memory sends a notification to the general execution unit are illustrated in FIG. 4, the present embodiment is not limited thereto.

In some alternative implementations of the present embodiment, the general execution unit may be further configured to: detect whether a value of a target local variable is updated in a polling approach; and continue executing the instruction in the received code block, in response to detecting that the value of the target local variable is updated.

In some alternative implementations of the present embodiment, the artificial intelligence chip may further include at least one computing cluster, and each computing cluster may include a data memory, at least one general execution unit, and at least one dedicated execution unit. The computing clusters may share an instruction memory.

Alternatively, each computing cluster may also include an instruction memory. The instruction memory in each computing cluster may be communicatively connected with the central processing unit.

Alternatively, the artificial intelligence chip may further include a global control memory, and each computing cluster may further include a local control memory. The global control memory may store a value of at least one global variable, and the local control memory may store a value of at least one local variable. The global control memory may be configured to: receive a global variable update request sent by the computing cluster, the global variable update request including a target value of a predetermined global variable; and update a value of the predetermined global variable to the target value.

Alternatively, the global control memory may be further configured to send to at least one local control memory, a notification that the predetermined global variable is updated; and the local control memory waiting for the notification that the predetermined global variable is updated may be further configured to update a value of a local variable associated with the predetermined global variable, in response to receiving the notification.

Alternatively, the local control memory may be further configured to: detect whether a value of a target global variable is updated in a polling approach; and update the value of the local variable associated with the predetermined global variable, in response to detecting that the value of the target local variable is updated, (and send a notification to each general execution unit indicating that the associated local variable is updated).

By providing a plurality of computing clusters, the artificial intelligence chip may be able to process a complex neural network model, such as a complex neural network model that includes a plurality of simple models. Moreover, by providing the global control memory, synchronization between different computing clusters may be implemented, thereby ensuring that the artificial intelligence chip can execute in a desired order when processing a plurality of simple models, further making the control of the artificial intelligence chip more flexible.

As can be seen from FIG. 4, the artificial intelligence chip in the present embodiment further includes a local control memory as compared with the embodiment corresponding to FIG. 2. Thus, the solution described in the present embodiment may implement synchronization between different general execution units, thereby ensuring that each code block of the kernel code is executed in a desired order and controlling of the artificial intelligence chip is more flexible.

Figure 5:
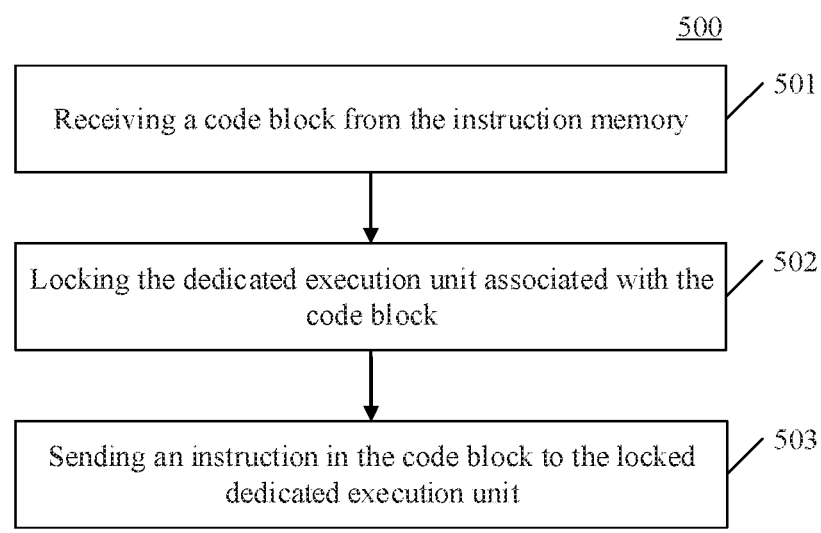
FIG. 5 is a flowchart of an embodiment of an instruction execution method for an artificial intelligence chip according to the present disclosure.

With further reference to FIG. 5, a flow 500 of an embodiment of an instruction execution method for an artificial intelligence chip according to the present disclosure is illustrated. The instruction execution method for an artificial intelligence chip may include the following steps.

Step 501, receiving a code block from the instruction memory.

In the present embodiment, the artificial intelligence chip includes an instruction memory, a data memory, at least one general execution unit, and at least one dedicated execution unit. The instruction memory is communicatively connected with a central processing unit. An executing body of the instruction execution method for an artificial intelligence chip (e.g., the general execution unit of the artificial intelligence chip 12 in FIG. 1) may receive a code block from the instruction memory. The code block is acquired by the instruction memory from a kernel code sent by the CPU of a host, and the code block is associated with the dedicated execution unit.

In some alternative implementations of the present embodiment, the kernel code may be acquired by parsing an input data flow diagram by the CPU. For example, the data flow diagram is converted to kernel code of a particular programming language (e.g., C, C++, Java, etc.) according to an agreed programming protocol. Here, the data flow diagram may be acquired by mapping a static map of a neural network model inputted by the user.

In some alternative implementations of the present embodiment, the code block may include a first instruction and a second instruction set. The first instruction is used to lock a dedicated execution unit associated with the code block when executed by the general execution unit. Each second instruction in the second instruction set is used to process a computationally intensive computing task when executed by the dedicated execution unit. The second instructions in the second instruction set are sent by the general execution unit to the dedicated execution unit after execution of the first instruction (i.e., after locking the dedicated execution unit).

For example, for a code block including the following code "lock(dma);loadDataToL2( );", "lock(dma)" is the first instruction of the code block, and "loadDataToL2( )" is the second instruction of the code block. The first instruction is used to lock a dedicated execution unit named "dma", and the second instruction is used to load data into the level 2 cache.

In some alternative implementations of the present embodiment, the code block may also include a loop fragment. The loop fragment may include the second instruction set. That is, each second instruction in the second instruction set is executed cyclically after the first instruction is executed.

For example, for a code block including the following code "lock(mac);while(1){convolution( );"}", "lock(mac)" is the first instruction of the code block, "while (1) (convolution( );}" is the loop fragment of the code block, and "convolution( )" is the second instruction in the loop fragment. The first instruction is used to lock the dedicated execution unit named "mac", the second instruction is used to perform a convolution operation, and the loop fragment is used to cyclically execute the second instruction (i.e., cyclically execute the convolution operation).

Step 502, locking the dedicated execution unit associated with the code block.

In the present embodiment, the executing body may lock the dedicated execution unit associated with the code block. As an example, if the general execution unit receives a code block including the following code "lock(dma);loadDataToL2( );", the general execution unit may execute the first instruction "lock(dma)" to lock the dedicated execution unit named "dma".

It should be noted that the general execution unit may lock one dedicated execution unit or lock more than one dedicated execution unit.

Step 503, sending an instruction in the code block to the locked dedicated execution unit.

In the present embodiment, after locking the dedicated execution unit associated with the code block, the executing body may send an instruction in the received code block for processing a computationally intensive task to the locked dedicated execution unit. The dedicated execution unit is configured to execute the received instruction and store an execution result in the data memory.

As an example, when a dedicated execution unit is locked, the executing body may send the second instructions in the second instruction set of the code block sequentially to the locked dedicated execution unit in the order of execution.

In another example, when more than one dedicated execution unit is locked, for each second instruction in the second instruction set of the code block, the executing body may first determine a dedicated execution unit from the at least one locked dedicated execution unit to execute the second instruction, and then send the second instruction to the determined dedicated execution unit.

In some alternative implementations of the present embodiment, the artificial intelligence chip may further include a local control memory storing a value of at least one local variable, and the local control memory may be configured to: receive a local variable update request sent by the general execution unit, the local variable update request including a target value of a predetermined local variable; and update a value of the predetermined local variable to the target value.

Alternatively, the instruction execution method for an artificial intelligence chip may further include: continuing executing the instruction in the code block, in response to receiving a notification that a target local variable is updated.

As an example, the instruction in the code block requires execution results of other general execution units when executed. In this case, the executing body may be in a waiting state after locking the dedicated execution unit. The other general execution units send an update request for the local variable A to the local control memory after the execution of the operation. After the local control memory updates the local variable A, a notification that the local variable A is updated is sent to the executing body. After receiving the notification, the executing body continues executing the instruction in the code block.

Alternatively, the instruction execution method for an artificial intelligence chip may further include: detecting whether a value of a target local variable is updated in a polling approach; and continuing executing the instruction in the code block, in response to detecting that the value of the target local variable is updated.

In some alternative implementations of the present embodiment, the artificial intelligence chip may further include at least one computing cluster, and each computing cluster may include a data memory, at least one general execution unit, and at least one dedicated execution unit. The computing clusters may share an instruction memory.

Alternatively, each computing cluster may also include an instruction memory. The instruction memory in each computing cluster may be communicatively connected with the central processing unit.

Alternatively, the artificial intelligence chip may further include a global control memory, and each computing cluster may further include a local control memory. The global control memory may store a value of at least one global variable, and the local control memory may store a value of at least one local variable. The global control memory may be configured to: receive a global variable update request sent by the computing cluster, the global variable update request including a target value of a predetermined global variable; and update a value of the predetermined global variable to the target value.

Alternatively, the global control memory may be further configured to send to at least one local control memory, a notification that the predetermined global variable is updated; and the local control memory waiting for the notification that the predetermined global variable is updated may be further configured to update a value of a local variable associated with the predetermined global variable, in response to receiving the notification.

Alternatively, the local control memory may be further configured to: detect whether a value of a target global variable is updated in a polling approach; and update the value of the local variable associated with the predetermined global variable, in response to detecting that the value of the target local variable is updated, (and send a notification to the general execution units indicating that the associated local variable is updated).

By providing a plurality of computing clusters, the artificial intelligence chip may be able to process a complex neural network model, such as a complex neural network model that includes a plurality of simple models. Moreover, by providing the global control memory, synchronization between different computing clusters may be implemented, thereby ensuring that the artificial intelligence chip can execute in a desired order when processing a plurality of simple models, further making the control of the artificial intelligence chip more flexible.

The instruction execution method for an artificial intelligence chip provided by the above embodiment of the present disclosure, receives a code block from the instruction memory, then locks the dedicated execution unit associated with the code block, and finally sends an instruction in the code block to the locked dedicated execution unit, thereby avoiding frequent communication with the CPU during execution of the kernel code and avoiding frequent locking/unlocking of the dedicated execution unit, improving the performance of the artificial intelligence chip.

Figure 6:
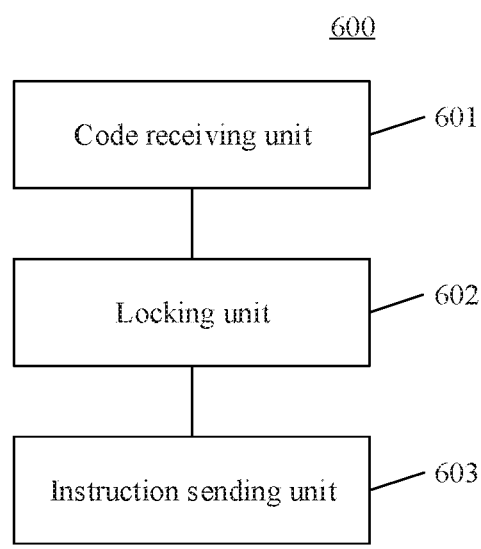
FIG. 6 is a schematic structural diagram of an embodiment of an instruction execution apparatus for an artificial intelligence chip according to the present disclosure.

With further reference to FIG. 6, as an implementation of the method shown in FIG. 5, the present disclosure provides an embodiment of an instruction execution apparatus for an artificial intelligence chip, and the apparatus embodiment corresponds to the method embodiment as shown in FIG. 5, and the apparatus may be specifically applied to a general execution unit of an artificial intelligence chip.

As shown in FIG. 6, the instruction execution apparatus 600 for an artificial intelligence chip of the present embodiment may include a code receiving unit 601, a locking unit 602 and an instruction sending unit 603. The code receiving unit 601 is configured to receive a code block from the instruction memory, the code block being acquired by the instruction memory from a kernel code sent by the central processing unit, the code block being associated with a dedicated execution unit. The locking unit 602 is configured to lock the dedicated execution unit associated with the code block. The instruction sending unit 603 is configured to send an instruction in the code block to the locked dedicated execution unit, the dedicated execution unit being configured to execute the received instruction and store an execution result in the data memory.

In the present embodiment, the artificial intelligence chip may include an instruction memory, a data memory, at least one general execution unit, and at least one dedicated execution unit. The instruction memory is communicatively connected with a central processing unit. The code receiving unit 601 of the instruction execution apparatus for an artificial intelligence chip may receive a code block from the instruction memory. The code block is acquired by the instruction memory from a kernel code sent by the CPU of a host, and the code block is associated with the dedicated execution unit.

In some alternative implementations of the present embodiment, the kernel code may be acquired by parsing an input data flow diagram by the CPU. For example, the data flow diagram is converted to a kernel code of a particular programming language (e.g., C, C++, Java, etc.) according to an agreed programming protocol. Here, the data flow diagram may be acquired by mapping a static map of a neural network model inputted by the user.

In the present embodiment, the locking unit 602 may lock the dedicated execution unit associated with the code block. As an example, if the general execution unit receives a code block including the following code "lock(dma);loadDataToL2( );", the general execution unit may execute the first instruction "lock(dma)" to lock the dedicated execution unit named "dma".

In some alternative implementations of the present embodiment, the code block may include a first instruction and a second instruction set. The locking unit 602 may be specifically configured to: execute the first instruction to lock the dedicated execution unit associated with the code block.

In the present embodiment, after locking the dedicated execution unit associated with the code block, the instruction sending unit 603 may send an instruction in the received code block for processing a computationally intensive task to the locked dedicated execution unit. The dedicated execution unit is configured to execute the received instruction and store an execution result in the data memory.

In some alternative implementations of the present embodiment, the instruction sending unit 603 may be specifically configured to: send second instructions in the second instruction set sequentially to the locked dedicated execution unit.

In some alternative implementations of the present embodiment, the instruction sending unit 603 may be specifically configured to: determine, for a second instruction in the second instruction set, a dedicated execution unit from the at least one locked dedicated execution unit to execute the second instruction, and send the second instruction to the determined dedicated execution unit.

In some alternative implementations of the present embodiment, the artificial intelligence chip may further include a local control memory storing a value of at least one local variable. The local control memory may be configured to: receive a local variable update request sent by the general execution unit, the local variable update request including a target value of a predetermined local variable; and update a value of the predetermined local variable to the target value.

In some alternative implementations of the present embodiment, the artificial intelligence chip may further include a local control memory storing a value of at least one local variable. The apparatus 600 may further include a continuing execution unit. The continuing execution unit may be configured to: continue executing the instruction in the code block, in response to receiving a notification that a target local variable is updated.

In some alternative implementations of the present embodiment, the artificial intelligence chip may further include a local control memory storing a value of at least one local variable. The apparatus 600 may further include a detection unit and a continuing execution unit. The detection unit may be configured to detect whether a value of a target local variable is updated in a polling approach; and the continuing execution unit may be configured to continue executing the instruction in the code block, in response to detecting that the value of the target local variable is updated.

In some alternative implementations of the present embodiment, the artificial intelligence chip may further include at least one computing cluster. Each computing cluster may include a data memory, at least one general execution unit, and at least one dedicated execution unit.

In some alternative implementations of the present embodiment, the artificial intelligence chip may further include a global control memory, each computing cluster may further include a local control memory. The global control memory stores a value of at least one global variable, and the local control memory stores a value of at least one local variable. The global control memory may be configured to: receive a global variable update request sent by the computing cluster, the global variable update request including a target value of a predetermined global variable; and update a value of the predetermined global variable to the target value.

In some alternative implementations of the present embodiment, the global control memory may be further configured to send to at least one local control memory, a notification that the predetermined local variable is updated. The local control memory waiting for the notification that the predetermined local variable is updated may be further configured to update a value of a local variable associated with the predetermined global variable, in response to receiving the notification.

In some alternative implementations of the present embodiment, the local control memory may be further configured to: detect whether a value of a target global variable is updated in a polling approach; and update the value of the local variable associated with the predetermined global variable, in response to detecting that the value of the target local variable is updated.

In some alternative implementations of the present embodiment, the dedicated execution unit locked by the general execution unit is not unlocked during execution of the kernel code.

In some alternative implementations of the present embodiment, the apparatus 600 may further include a circulating unit. The circulating unit may be configured to cyclically execute the second instruction set after executing the first instruction.

The instruction execution apparatus for an artificial intelligence chip provided by the above embodiment of the present disclosure, receives a kernel code from the instruction memory, then locks the dedicated execution unit associated with the code block, and finally sends an instruction in the code block to the locked dedicated execution unit, thereby avoiding frequent communication with the CPU during execution of the kernel code and avoiding frequent locking/unlocking of the dedicated execution unit, improving the performance of the artificial intelligence chip.

An embodiment of the present disclosure also provides an electronic device. The structure of the electronic device may be referred to FIG. 7, which shows a schematic structural diagram of a computer system 700 of an embodiment of the electronic device of the present disclosure. The electronic device shown in FIG. 7 is merely an example, and should not impose any limitation on the function and scope of use of the embodiments of the present disclosure.

Figure 7:
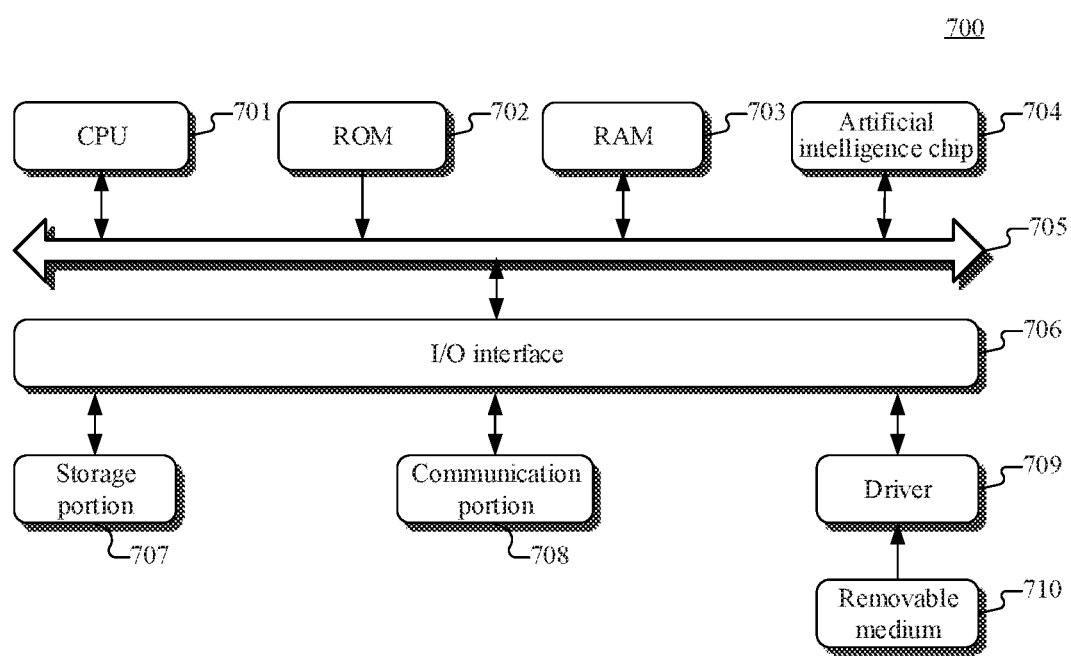
FIG. 7 is a schematic structural diagram of a computer system adapted to implement an electronic device of the embodiments of the present disclosure.

As shown in FIG. 7, the computer system 700 includes one or more central processing unit (CPU) 701 and one or more artificial intelligence chip 704. The CPU 701 may execute various appropriate actions and processes in accordance with a program stored in a read-only memory (ROM) 702 or a program loaded into a random access memory (RAM) 703 from a storage portion 707. The artificial intelligence chip 704 may include an instruction memory, a data memory, at least one general execution unit, and at least one dedicated execution unit. The artificial intelligence chip 704 may execute various appropriate actions and processes in accordance with the program received from the CPU 701. The RAM 703 also stores various programs and data required by operations of the system 700. The CPU 701, the ROM 702, the RAM 703 and the artificial intelligence chip 704 are connected to each other through a bus 705. An input/output (I/O) interface 706 is also connected to the bus 705.

The following components are connected to the I/O interface 706: a storage portion 707 including a hard disk or the like; and a communication portion 708 including a network interface card, such as a LAN card and a modem. The communication portion 708 performs communication processes via a network, such as the Internet. A driver 709 is also connected to the I/O interface 706 as required. A removable medium 710, such as a magnetic disk, an optical disk, a magneto-optical disk, and a semiconductor memory, may be installed on the driver 709, to facilitate the retrieval of a computer program from the removable medium 710, and the installation thereof on the storage portion 707 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 708, and/or may be installed from the removable medium 710. The computer program, when executed by the general execution unit of the artificial intelligence chip 704, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a general execution unit, for example, may be described as: a general execution unit, including a code receiving unit, a locking unit and an instruction sending unit. Here, the names of these units do not in some cases constitute limitations to such units themselves. For example, the code receiving unit may also be described as "a unit configured to receive a code block from the instruction memory."

In another aspect, the present disclosure further provides a computer readable medium. The computer readable medium may be included in the general execution unit of an artificial intelligence chip in the above described embodiments, or a stand-alone computer readable medium not assembled into the general execution unit. The computer readable medium stores one or more programs. The one or more programs, when executed by the general execution unit, cause the general execution unit to: receive a code block from the instruction memory, the code block being acquired by the instruction memory from a kernel code sent by the central processing unit, the code block being associated with a dedicated execution unit; lock the dedicated execution unit associated with the code block; and send an instruction in the code block to the locked dedicated execution unit, the dedicated execution unit being configured to execute the received instruction and store an execution result in the data memory.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. An artificial intelligence chip, comprised in a host, comprising an instruction memory, a data memory, at least one first execution unit, and at least one second execution unit;
   the instruction memory is configured to: receive a kernel code sent by a central processing unit of the host, the kernel code being source code implements a compute kernel, and comprising at least one code block, a code block in the at least one code block being a block of source code specifying instructions executed by a second execution unit of the at least one second execution unit, comprising a first instruction and a second instruction set, and associated with a first execution unit of the at least one first execution unit and the second execution unit;
   the first execution unit is configured to: execute, in response to receiving the code block from the instruction memory, the first instruction to lock the second execution unit associated with the received code block, lock the second execution unit associated with the received code block, and send second instructions in the second instruction set sequentially to the locked second execution unit, each second instruction in the second instruction set being executed cyclically after the first instruction being executed;
   the locked second execution unit is configured to: receive the instruction sent by the first execution unit, execute the received instruction, and store an execution result in the data memory; and
   the data memory is configured to: store the execution result sent by the locked second execution unit.

2. The artificial intelligence chip according to claim 1, wherein the code block in the at least one code block comprises the first instruction and the second instruction set; and
   the first execution unit is specifically configured to:
   execute, in response to receiving the code block, the first instruction to lock at least one second execution unit associated with the received code block; and
   determine, for a second instruction in the second instruction set, a second execution unit from the at least one locked second execution unit to execute the second instruction, and send the second instruction to the determined second execution unit.

3. The artificial intelligence chip according to claim 1, wherein the artificial intelligence chip further comprises a local control memory storing a value of at least one local variable, and the local control memory is configured to:
   receive a local variable update request sent by the first execution unit, the local variable update request comprising a target value of a predetermined local variable; and update a value of the predetermined local variable to the target value.

4. The artificial intelligence chip according to claim 3, wherein the local control memory is further configured to send to the at least one first execution unit, a notification that the predetermined local variable is updated; and
   the first execution unit waiting for the notification that the predetermined local variable is updated is further configured to continue executing the instruction in the received code block, in response to receiving the notification.

5. The artificial intelligence chip according to claim 3, wherein the first execution unit is further configured to:
   detect whether a value of a target local variable is updated in a polling approach; and
continue executing the instruction in the received code block, in response to detecting that the value of the target local variable is updated.

6. The artificial intelligence chip according to claim 1, wherein the artificial intelligence chip further comprises at least one computing cluster, a computing cluster in the at least one computing cluster comprises a data memory, at least one general execution unit, and at least one second execution unit.

7. The artificial intelligence chip according to claim 6, wherein the artificial intelligence chip further comprises a global control memory, the computing cluster further comprises a local control memory, the global control memory stores a value of at least one global variable, the local control memory stores a value of at least one local variable; and
   the global control memory is configured to:
      receive a global variable update request sent by the computing cluster, the global variable update request comprising a target value of a predetermined global variable; and
      update a value of the predetermined global variable to the target value.

8. The artificial intelligence chip according to claim 7, wherein the global control memory is further configured to send to at least one local control memory, a notification that the predetermined global variable is updated; and
   the local control memory waiting for the notification that the predetermined global variable is updated is further configured to update a value of a local variable associated with the predetermined global variable, in response to receiving the notification.

9. The artificial intelligence chip according to claim 7, wherein the local control memory is further configured to:
   detect whether a value of a target global variable is updated in a polling approach; and
   update the value of the local variable associated with the predetermined global variable, in response to detecting that the value of the target local variable is updated.

10. The artificial intelligence chip according to claim 1, wherein the second execution unit locked by the first execution unit is not unlocked during execution of the kernel code.

11. The artificial intelligence chip according to claim 1, wherein the first execution unit is further configured to:
cyclically execute the second instruction set after executing the first instruction.

12. The artificial intelligence chip according to claim 1, wherein the kernel code is acquired by parsing an input data flow diagram by the central processing unit, and the data flow diagram is acquired by mapping a static map of a neural network model.

13. An instruction execution method for an artificial intelligence chip, the artificial intelligence chip comprised in a host and comprising an instruction memory, a data memory, at least one first execution unit, and at least one second execution unit, the instruction memory being communicatively connected with a central processing unit, the method comprising;
   receiving, by a first execution unit of the at least one first execution unit, a code block from the instruction memory, the code block being acquired by the instruction memory from a kernel code sent by the central processing unit of the host, the code block being a block of source code specifying instructions executed by a second execution unit of the at least one second execution unit, comprising a first instruction and a second instruction set, and associated with the first execution unit and the second execution unit, and the kernel code being source code implements a compute kernel;
   executing, by the first execution unit, in response to receiving the code block, the first instruction to lock the second execution unit associated with the received code block;
   locking, by the first execution unit, the second execution unit associated with the code block; and
   sending, by the first execution unit, second instructions in the second instruction set sequentially to the locked second execution unit, each second instruction in the second instruction set being executed cyclically after the first instruction being executed, and the locked second execution unit being configured to execute the received instruction and store an execution result in the data memory.

14. The method according to claim 13, wherein the artificial intelligence chip further comprises a local control memory storing a value of at least one local variable; and
   the method further comprises:
      continuing executing, by the first execution unit, the instruction in the code block, in response to receiving a notification that a target local variable is updated.

15. The method according to claim 13, wherein the artificial intelligence chip further comprises a local control memory storing a value of at least one local variable; and
   the method further comprises:
      detecting, by the first execution unit, whether a value of a target local variable is updated in a polling approach; and
      continuing executing, by the first execution unit, the instruction in the code block, in response to detecting that the value of the target local variable is updated.

16. An instruction execution apparatus for an artificial intelligence chip, the artificial intelligence chip comprised in a host and comprising an instruction memory, a data memory, at least one first execution unit, and at least one second execution unit, the instruction memory being communicatively connected with a central processing unit, the apparatus comprising:
   at least one processor; and
   a memory storing instructions, the instructions when executed by the at least one processor, cause the at least one processor to perform operations, the operations comprising:
      receiving, by a first execution unit of the at least one first execution unit, a code block from the instruction memory, the code block being acquired by the instruction memory from a kernel code sent by the central processing unit of the host, the code block being a block of source code specifying instructions executed by a second execution unit of the at least one second execution unit, comprising a first instruction and a second instruction set, and associated with the first execution unit and the second execution unit, and the kernel code being source code implements a compute kernel;

executing, by the first execution unit, in response to receiving the code block, the first instruction to lock the second execution unit associated with the received code block;

locking, by the first execution unit, the second execution unit associated with the code block; and sending, by the first execution unit, second instructions in the second instruction set sequentially to the locked second execution unit, each second instruction in the second instruction set being executed cyclically after the first instruction being executed, and the locked second execution unit being configured to execute the received instruction and store an execution result in the data memory.

\* \* \* \* \*